US 6,701,876 B2

(12) United States Patent
Youqing

(10) Patent No.: US 6,701,876 B2
(45) Date of Patent: *Mar. 9, 2004

(54) ELECTROMECHANICAL ENGINE VALVE ACTUATOR SYSTEM WITH REDUCED ARMATURE IMPACT

(75) Inventor: Xiang Youqing, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/965,227

(22) Filed: Sep. 27, 2001

(65) Prior Publication Data

US 2003/0056740 A1 Mar. 27, 2003

(51) Int. Cl.[7] .................................................. F01L 9/04
(52) U.S. Cl. .............................. 123/90.11; 251/129.01; 251/129.02; 251/129.16
(58) Field of Search .................. 123/90.11; 251/129.01, 251/129.02, 129.16

(56) References Cited

U.S. PATENT DOCUMENTS

| 5,884,591 | A | * | 3/1999 | Giese | 123/90.11 |
| 6,044,814 | A | * | 4/2000 | Fuwa | 123/90.11 |
| 6,141,201 | A |   | 10/2000 | Schmitz | |
| 6,176,208 | B1 |   | 1/2001 | Tsuzuki et al. | |
| 6,269,784 | B1 | * | 8/2001 | Newton | 123/90.11 |
| 6,340,008 | B1 | * | 1/2002 | Boie et al. | 123/90.11 |
| 6,378,473 | B2 | * | 4/2002 | Yamaki et al. | 123/90.11 |
| 6,382,175 | B1 | * | 5/2002 | van der Staay et al. | 123/198 D |
| 6,390,036 | B1 | * | 5/2002 | Yuuki | 123/90.11 |
| 6,474,276 | B1 |   | 11/2002 | Schmitz et al. | |

FOREIGN PATENT DOCUMENTS

| JP | 11 0159313 | 6/1999 |
| JP | 200013-128 A1 | 5/2000 |
| JP | 2002241222 A | 9/2000 |
| WO | WO 00/71861 A1 | 11/2000 |
| WO | WO 00/73634 A1 | 12/2000 |

OTHER PUBLICATIONS

Taniguchi et al. , US Patent Appication Pub. No. 2001/0002586 A1, Jun. 7, 2001.*
Camless engine, Automotive Engineering International, Dec. 2000, pp 86.*

* cited by examiner

Primary Examiner—Thomas Denion
Assistant Examiner—Ching Chang
(74) Attorney, Agent, or Firm—John E. Kajander, Esq.

(57) ABSTRACT

An electromechanical engine valve actuation system 10 is provided including a control element 16, a first actuator 18, a second actuator 20, an armature element 26 and a motion detector 32. The control element 16 controls the first actuator 18 and the second actuator 20 in response to the motion detector 32 in order to reduce the impact of the armature element 26.

17 Claims, 3 Drawing Sheets

ELECTROMECHANICAL ENGINE VALVE ACTUATOR SYSTEM WITH REDUCED ARMATURE IMPACT

TECHNICAL FIELD

The present invention relates generally to an electromechanical engine valve actuator system and more particularly to an electromechanical engine valve actuator system with reduced armature impact.

BACKGROUND OF THE INVENTION

Electromechanical engine valve actuation systems utilize electromagnetic actuators to control the movement of an armature and thereby the engine valve. Typically, the armature is moved back and forth between two electromagnets and is held against the face of these magnets depending on which one is actuated. Commonly, one electromagnet represents a closing magnet while the other one represents an opening magnet. To move the cylinder valve from an open position to a closed position, the power is shut off at the open magnet. A restoring spring begins to move the armature away from the open magnet. As the armature passed its resting position, a second restoring spring slows the armature's movement as it approaches the closing magnet. The closing magnet is then charged with a current to capture and hold the armature into the closing position. Often, during this procedure, however, the armature may impact the face of the activated electromagnet with undesirable force. This impact can result in undesirable acoustics as well as undesirable wear on the actuator. The undesirable wear may result in low reliability and durability.

A variety of methods have been developed in an effort to reduce the impact of the actuator on the face of the actuator element. One directional approach to reducing such impact has taken the route of modifying the actuator shape in an attempt to reduce seating impact. These approaches can have negative impacts on design and production costs and leave significant room for improvement in the reduction of seating impact. Other soft seating approaches have contemplated limiting the voltage applied to the coil to a maximum valve when the armature approaches the pole face. Although this method may limit seating impact, it too leaves room for improvement. Present systems often fail to allow for adaptability once integrated into an engine system. A more adaptive system that allowed for and accommodated changes in the engine valve actuation system would be highly desirable.

It would, therefore, be highly desirable to have an electromechanical engine valve actuation system that provided reduced actuator impact based on the actual actuator movement such that the electromechanical engine valve actuation system has improved performance and is more adaptive and reliable than present systems.

SUMMARY OF THE INVENTION

It is therefore one object of the present invention to provide an electromechanical engine valve actuation system with reduced actuator impact. It is further an object of the present invention to provide such an electromechanical engine valve actuation system with improved flexibility and reliability in reducing actuator impact.

In accordance with the objects of the present invention, an electromechanical engine valve actuator system is provided. The electromechanical engine valve actuation system includes an armature, a first actuator, and a second actuator. A motion detector generates a signal in relation to the armature element's position. The signal is sent to a control element and the control element controls the first actuator and the second actuator in response to the signal.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
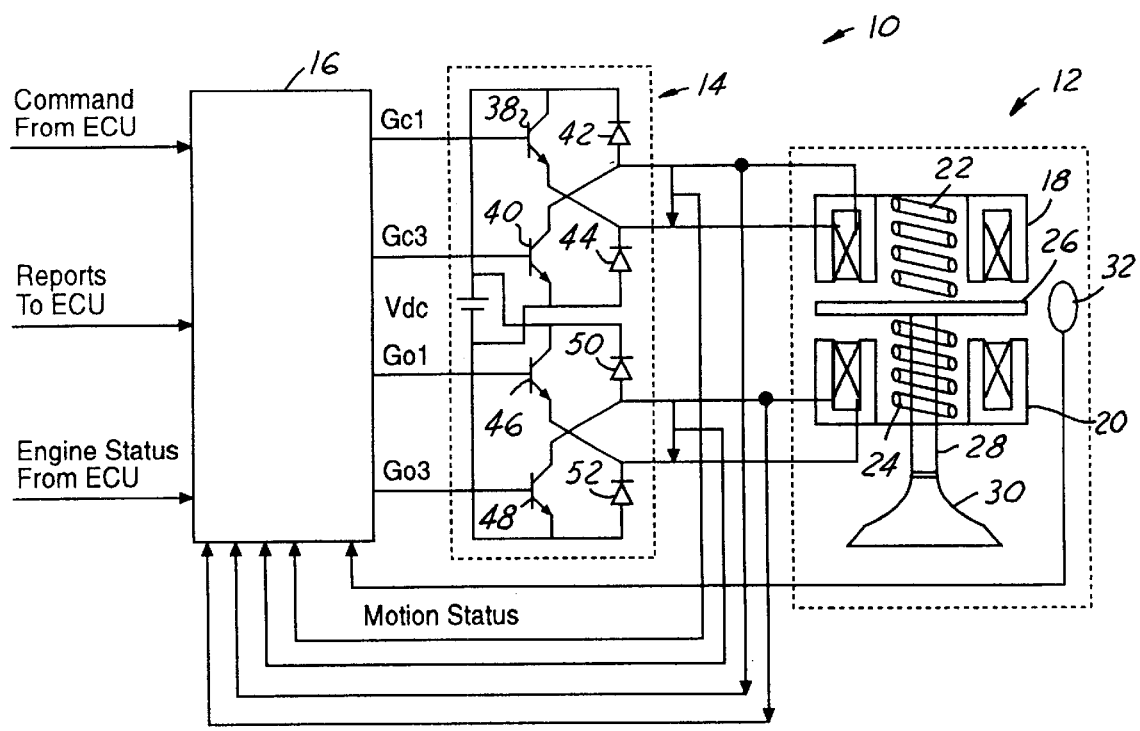
FIG. 1 is an illustration of an embodiment of an electromechanical engine valve actuation system in accordance with the present invention.

Referring now to FIG. 1, which is an illustration of an embodiment of an electromechanical engine valve actuation 10 in accordance with the present invention. The electromechanical engine valve actuation system 10 includes a valve actuator 12, a switching element 14 and a controller element 16. The valve actuator 12 includes a closing actuator 18, an opening actuator 20, a first restoring spring 22, a second restoring spring 24, and an armature element 26 attached to a stem 28 of a cylinder valve 30. The use of a controller element 16, switching element 14, and valve actuator 12 to control the operation of a cylinder valve 30 is well known in the prior art.

The present invention, however, further includes a motion detector 32 positioned between the closing actuator 18 and the opening actuator 20. The use of a motion detector 32 allows controller element 16 to monitor the position, and in some embodiments the velocity, of the armature element 26. By monitoring when the armature element 26, and possibly by measuring its velocity at the time, can adjust the power to the closing actuator 18 or the opening actuator 20 to reduce the impact of the armature element 26 when it comes in contact with either the closing actuator 18 or the opening actuator 20. The use of the motion detector 32 allows for a real time detection of the armature element 26 movement and thereby allows for greater control and adjustment of the armature element's 26 movement.

Figures 3A, 4A:
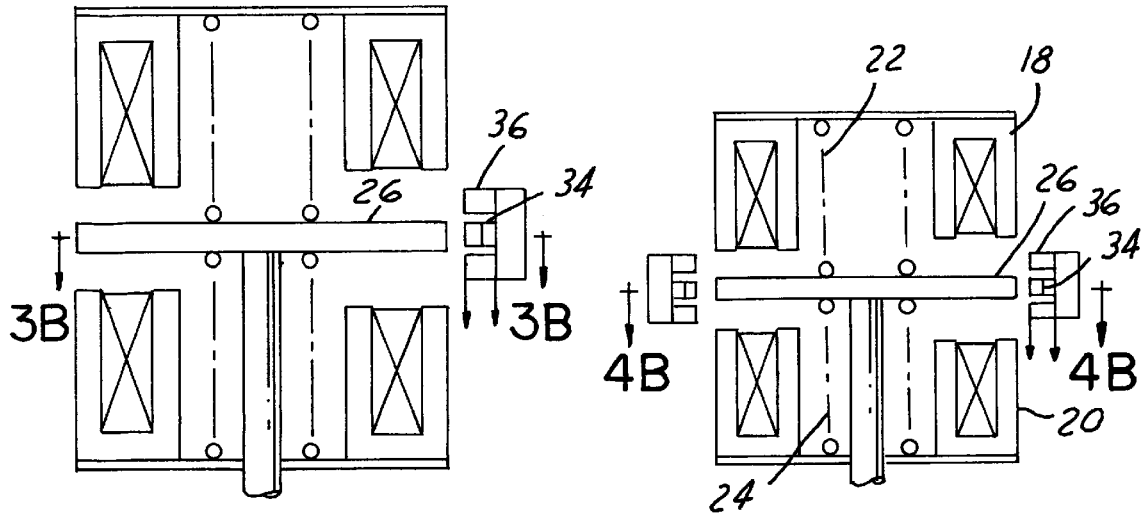
FIG. 3A is a cross-sectional illustration of a valve actuator in accordance with the present invention.
FIG. 4A is a cross-sectional illustration of a valve actuator in accordance with the present invention.
Figures 3B, 4B:
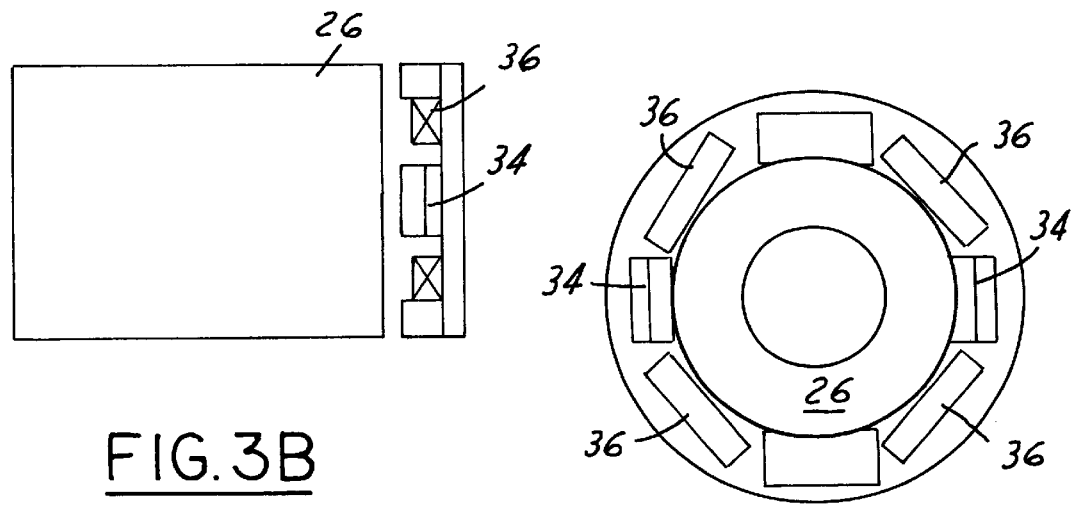
FIG. 3B is a top view detail of a motion detector as illustrated in FIG. 3A in accordance with the present invention.
FIG. 4B is a top view detail of a motion detector as illustrated in FIG. 4A in accordance with the present invention.

Although a wide variety of motion detectors 32 are contemplated for use with the present invention, one embodiment, illustrated in FIG. 3, utilizes a permanent magnet 34 positioned between a motion detector coil 36 to create a discrete motion detector 32. In this embodiment, the armature element 26 closes the flux path created by the permanent magnet 34 allowing the controller element 16 which is in communication with the detector coil 36 to determine the position and velocity of the armature element 26 as it passes the motion detector 32. Although one form of discrete motion detector 32 has been described, it should be understood that a wide variety of discrete motion detectors are contemplated by the present invention. The discrete motion detector 32 may also be formed in a variety of configurations, including a square configuration (see FIGS. 3A and 3B) or a circular configuration (see FIGS. 4A and 4B). It should be understood, however, that these configurations are primarily for design and packaging purposes and are not intended as a limitation on the design of the discrete motion detector 32.

The controller element 16 powers and depowers the closing actuator 18 and the opening actuator 20 through the use of a switching element 14. The use of switching elements 14 to route power to valve actuators 12 is well known in the prior art. The present invention, however, in one embodiment, contemplates the novel use of a regenerative switching power converter as a switching element 14. The regenerative switching power converter 14 includes a first closing gate 38, a second closing gate 40, a first closing diode 42 and a second closing diode 44. The use of such a dual gate/dual diode configuration allows a switch 14 to allow magnetic field energy stored in the closing actuator 18 to be dumped back into a battery (not shown) and thereby increase the efficiency of the electromechanical engine valve actuation system 10. In a similar fashion, the switching element 14 also includes a first opening gate 46, a second opening gate 48, a first opening diode 50, and a second opening diode 52. This portion of the switching element 14 allows the magnetic field energy stored in the opening actuator 20 to be dumped back into a battery (not shown) when the opening actuator 20 is deactivated. The use of such regenerative switching power converters is known in the electronic industry, however, its unique use in combination with the valve actuator 12 as described by the present invention creates a novel electromechanical engine valve actuation system 10 with both improved performance and efficiency.

Figure 2:
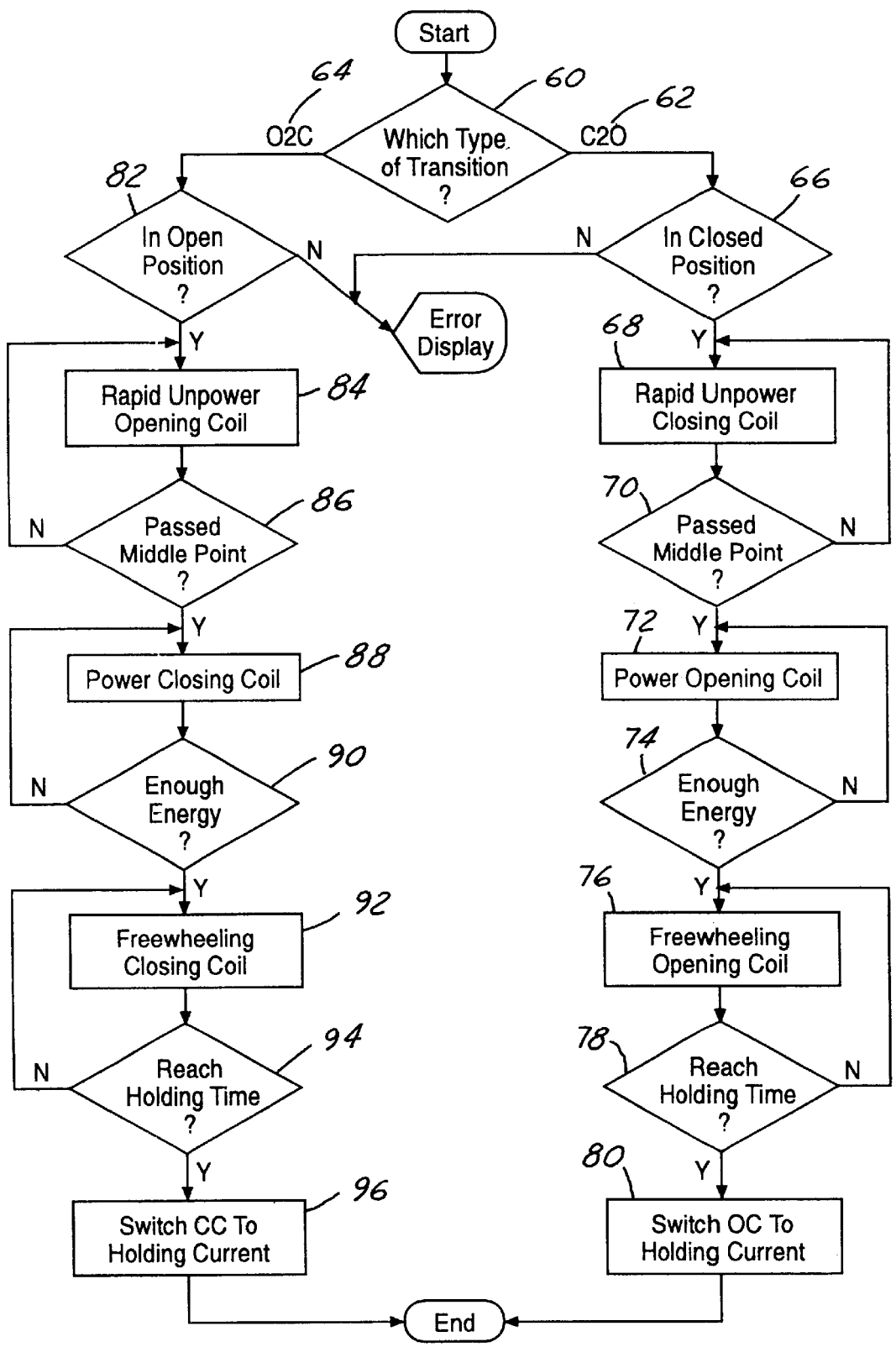
FIG. 2 is a flow chart of the electromechanical engine valve actuation system in accordance with the present invention.

Referring now to FIG. 2, which is a flow chart of the operation of the electromechanical engine valve actuation system 10 as contemplated by the present invention. A method of controlling the valve actuator 12 to reduce armature element 26 impact is illustrated. The method includes determining transition type 60. Determining transition type 60 simply is determining if the armature element 26 is to be moved from a closed position into an open position 62 or from an open position into a closed position 64. If the actuator element 26 is to be moved from a closed position to an open position 62, an initial step of verifying the actuator element 26 is in the closed position 66 may be performed. If it is, the step of rapidly unpowering the closing actuator 68 is performed. Once the closing actuator 18 is unpowered, the first restoring spring 22 will move the armature element 26 away from the closing actuator 18 and towards the opening actuator 20. The motion detector 32 is used to determine when the armature element 26 passes the midpoint between the closing actuator 18 and the opening actuator 20. Once the step of determining is the actuator element has passed the midpoint 70 has been determined, the step of powering the opening coil 72 is performed. The controller element 16 uses the information provided by the motion detector 32 to determine the position and velocity of the armature element 26. With this information, the controller element 16 can power the opening actuator 20 with just enough energy to allow the armature element 26 to reach the opening actuator 20. A step of verifying the energy sent to the opening actuator 74 is then performed. Once the correct amount of energy has been sent to the opening actuator 20, the power to the opening actuator 20 is switched off and the armature element 26 moves using momentum towards the opening actuator 20. This step is known as freewheeling the opening coil 76. While the armature element 26 moves toward the opening actuator 20 under its own momentum, the controller element 16 calculates the time required for the armature element 26 to reach the opening actuator 20. Once the step known as reaching holding time 78 has expired, the step of switching the opening actuator to a holding current 80 is performed. At this step, the opening actuator 20 is powered with a minimum current necessary to hold the armature element 26 against the opening actuator 20. Using this method, including monitoring when the armature element 26 passes the midpoint 70, the power to the opening actuator 20 can be controlled by the controller element 16 such that the attractive force exerted on the armature element 26 is just enough to bring it softly into contact with opening actuator 20. This, in turn, reduces the impact force of the armature element 26 against the opening actuator 20 and thereby increase the performance and reliability of the electromechanical engine valve actuation system 10.

If, on the other hand, the armature element 26 is moving from an open position to a closing position 64, a set of similar steps are performed. In this scenario, the steps consist primarily of determining if the actuator element is in an opened position 82, rapidly unpowering the opened actuator 84, monitoring when the actuator element passes the midpoint between the open actuator and the closed actuator 86, powering closing actuator 88, verifying the energy powered to the closing coil 90, allowing the actuator element to freewheel towards the closing coil 92, calculating the time required for the actuator element to come into contact with the closing actuator 94 and switching the closing coil to a holding current 96. It should be understood that although the present invention has been described in terms of an opened position and a closed position, that these terms are strictly for the purposes of description and not intended as limitations on the present invention. A first position and a second position may be used interchangeably for the terms opened and closed.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An electromechanical engine valve actuation system comprising:

a control element;

a first actuator;

a second actuator;

an armature element positioned between said first actuator and said second actuator; and a motion detector generating a signal in relation to said armature element's position, said motion detector element sending said signal to said controller element when said armature element reaches a midpoint between said first actuator and said second actuator, wherein said control element controls said first actuator and said second actuator in response to said signal to reduce the impact of said armature element by rapidly unpowering said first actuator, followed by rapidly first powering said second actuator when said armature element reaches said midpoint, rapidly unpowering said second actuator immediately after said first powering to allow said armature element to freewheel towards said second actuator, and second powering said second actuator with a holding current when said armature element reaches said second actuator.

2. An electromechanical engine valve actuation system as described in claim 1 wherein said motion detector comprises:

a permanent magnet; and a motion detector coil.

3. An electromechanical engine valve actuation system as described in claim 1 further comprising:

a first restoring spring; and a second restoring spring.

4. An electromechanical engine valve actuation system A method as recited in claim 1 further comprising:

a switching element.

5. An electromechanical engine valve actuation system as described in claim 4 wherein said switching element comprising a regenerative switching power converter.

6. An electromechanical engine valve actuation system as described in claim 4 wherein said switching element comprises:

at least two closing gates and at least two diodes forming a regenerative switching power converter.

7. An electromechanical engine valve actuation system as described in claim 1 wherein said first actuator is a closing actuator for closing an engine valve; and said second actuator is an opening actuator to open said engine valve.

8. An electromechanical engine valve actuation system comprising:

a control element;

a switching element;

a first actuator;

an second actuator;

an armature element positioned between said first actuator and said second actuator;

a first restoring spring biasing said armature element away from said first actuator;

a second restoring spring biasing said armature element away from said second actuator; and a motion detector generating a signal in relation to said armature element's position, said motion detector element sending said signal to said controller element when said armature element reaches a midpoint between said first actuator and said second actuator, wherein said control element controls said first actuator and said second actuator in response to said signal to reduce the impact of said armature element by rapidly unpowering said first actuator, followed by rapidly first powering said second actuator when said armature element reaches said midpoint, rapidly unpowering said second actuator immediately after said first powering to allow said armature element to freewheel towards said second actuator, and second powering said second actuator with a holding current when said armature element reaches said second actuator.

9. An electromechanical engine valve actuation system as described in claim 8 wherein said motion detector comprises:

a permanent magnet; and a motion detector coil.

10. An electromechanical engine valve actuation system as described in claim 8 wherein said switching element comprising a regenerative switching power converter.

11. An electromechanical engine valve actuation system as described in claim 8 wherein said switching element comprises:

at least two closing gates and at least two diodes forming a regenerative switching power converter.

12. An electromechanical engine valve actuation system as described in claim 8 wherein said first actuator is a closing actuator for closing an engine valve; and said second actuator is an opening actuator to open said engine valve.

13. A method of moving an armature element from a first position in contact with a first actuator to a second position in contact with a second actuator comprising:

rapidly unpowering the first actuator;

monitoring, after said rapidly unpowering of the first actuator, when the armature element reaches a midpoint between the first actuator and the second actuator using a motion detector;

rapidly first powering the second actuator when the armature element reaches said midpoint;

rapidly unpowering the second actuator immediately following said first powering and allowing the armature element to freewheel towards the second actuator; and second powering the second actuator with a holding current when the armature element reaches the second actuator.

14. A method as described in claim 13, further comprising:

moving the armature element away from the first actuator using a first restoring spring.

15. A method as described in claim 13, further comprising:

capturing at least a portion of the magnetic energy stored in the first actuator.

16. A method as described in claim 13, wherein said motion detector comprises:

a permanent magnet; and a motion detector coil.

17. A method as described in claim 13 further comprising:

monitoring the armature elements position and velocity using said motion detector.

* * * * *